US008449847B2

(12) United States Patent
Haas et al.

(10) Patent No.: US 8,449,847 B2
(45) Date of Patent: May 28, 2013

(54) DEVICE AND METHOD FOR HANDLING MULTI-COMPONENT MIXTURE

(75) Inventors: Alfred Haas, Eppelheim (DE); Uwe Vietze, Eppelheim (DE); Andreas Christian Moeller, Linz (AT)

(73) Assignee: HTE Aktiengesellschaft The High Throughput Experimentation Company, Heidelberg (DE)

( * ) Notice: Subject to any disclaimer, the term of this patent is extended or adjusted under 35 U.S.C. 154(b) by 606 days.

(21) Appl. No.: 12/374,767

(22) PCT Filed: Jul. 24, 2007

(86) PCT No.: PCT/EP2007/006581
§ 371 (c)(1),
(2), (4) Date: Nov. 18, 2009

(87) PCT Pub. No.: WO2008/012073
PCT Pub. Date: Jan. 31, 2008

(65) Prior Publication Data
US 2011/0053797 A1    Mar. 3, 2011

(30) Foreign Application Priority Data
Jul. 24, 2006  (DE) .................. 10 2006 034 172

(51) Int. Cl.
*B01J 8/00*      (2006.01)
*B01J 10/00*     (2006.01)
*B01J 10/02*     (2006.01)
*B01J 12/00*     (2006.01)
*B01J 12/02*     (2006.01)
*B01J 14/00*     (2006.01)

(52) U.S. Cl.
USPC .......... 422/608; 422/129; 422/130; 422/603; 422/80; 422/83; 436/37

(58) Field of Classification Search
None
See application file for complete search history.

(56) References Cited

U.S. PATENT DOCUMENTS 6,086,832 A  *  7/2000  Ohta ........................... 422/211
6,497,844 B1 * 12/2002  Bacaud et al. ............. 422/68.1
6,551,832 B1    4/2003  Deves et al.
(Continued)

FOREIGN PATENT DOCUMENTS
WO    WO-02092220 A1    11/2002
WO    WO-2004052530 A1    6/2004
WO    WO-2005063372 A2    7/2005

OTHER PUBLICATIONS

International Preliminary Report on Patentability for PCT/EP2007/006581 issued Jan. 27, 2009.
(Continued)

*Primary Examiner* — Jill Warden
*Assistant Examiner* — Charles D Hammond
(74) *Attorney, Agent, or Firm* — Choate, Hall & Stewart LLP; Andrea L. C. Robidoux; Daniel S. Matthews

(57) ABSTRACT

Device and method for handling multi-component mixtures, comprising at least two not completely mixable fluid phases. The device comprises an arrangement of at least two high-pressure separators, being operatively connected each with a low-pressure separator. Each high-pressure separator comprises an outlet line for volatile gaseous constituents. Each low-pressure separator is operatively connected to a gas collecting container or shares at least one gas collecting container with a further low-pressure separator. At least one high-pressure separator has at least one outlet connection for gaseous constituents, being connected with a part to the analysis. The device is used in high-throughput research or in combinatory chemistry, preferably for the research of multi-component mixtures produced in experiments with catalyst, or in connection with high-pressure processes.

12 Claims, 8 Drawing Sheets

U.S. PATENT DOCUMENTS 7,537,739 B2 * 5/2009 Haas et al. .................. 422/603
2005/0169815 A1 8/2005 van den Brink et al.

OTHER PUBLICATIONS

Wallenstein D. et al., Applied Catalysis A: General 167 (1998) 141-155.
Wallenstein D. et al., Applied Catalysis A: General 231 (2002) 227-242.
International Search Report for PCT/EP2007/006581 published Dec. 4, 2007.

* cited by examiner

DEVICE AND METHOD FOR HANDLING MULTI-COMPONENT MIXTURE

The present invention relates to a device and a method for handling multi-component mixtures comprising at least two fluid phases that are not completely miscible. The device comprises an arrangement of at least two reaction spaces which are connected to a high-pressure separation unit, respectively, which is in operative connection with a low-pressure separation unit, respectively. Each individual high pressure separation unit comprises a discharge pipe for volatile gaseous components. Each individual low-pressure separation unit preferably is in operative connection with a gas-collecting receiver, respectively, wherein it is preferred that at least two low-pressure separation units share a gas-collecting receiver.

In a plurality of chemical processes multi-component mixtures are produced which, for example, are to be transferred from process systems to analysis systems. Thereby, multi-component mixtures typically have to be subjected to separation steps or to a product reprocessing. Preferably, multi-component mixtures are separated in separation units, wherein, for example, the liquid and the gaseous phase are separated from each other.

Basically, devices and methods for handling multi-component systems are known. For example, prior art in the field of handling multi-component mixtures are devices and methods for testing FCC-catalysts (Fluid Catalytic Cracking Catalysts) in the laboratory field, which are based on the standard ASTM-D 3907-80.

Further developments of the devices as described in ASTM-D 3907-80 have been published by D. Wallenstein et al. [see, for example, D. Wallenstein at al., Applied Catalysis A: General 167 (1998) 141-155, or D. Wallenstein at al., Applied Catalysis A: General 231 (2002) 227-242]. The methods described therein relate to a pulsative feeding of educt fluid into the reaction space, whereby the product fluids which emanate from the reaction space are directly transferred to a low-pressure system. Within the low-pressure system, the liquid and the gaseous ingredients of the product fluids are separated and subsequently are subjected independently from each other to an integral analysis, respectively.

An overview over the technical field the present application relates to is also given in WO 2005/063372 and in DE 103 61 003 B3. Qua reference, the content of these documents is to be part of the present disclosure.

One of the objects according to the invention is to provide a device and a method by means of which an effective handling and analysis of multi-component mixtures from chemical processing devices respectively the reaction spaces thereof can be conducted, in particular for test reactions having low product volumes which are carried out in parallel.

According to another aspect of the object according to the invention, the device and the method shall allow for achieving a mass balance being as precise and as consistent as possible in the quantification of the individual components respectively groups of components. Furthermore, it is a target according to the invention to develop a device and a method by means of which a semi-automatic respectively fully-automatic computer-controlled guidance can be performed. Moreover, with the aid of the device and the method a particularly time-saving process guidance should be possible.

The objects mentioned here and further objects are solved thereby that a device for handling and analyzing multi-component mixtures is provided, which comprises at least the following components:

(a) at least two parallel reaction spaces (20, 20'01, 20'02, . . . )
(b) per reaction space at least one connection from the discharge side of the reaction space to at least one high-pressure separation unit (80);
(c) per reaction space at least one high-pressure separation unit (80);
(d) per high-pressure separation unit (80) at least one low-pressure separation unit (80') which is connected with said unit via a connection.

Thereby, preferably one further preferred all, high-pressure separation units (80) have at least one discharge connection (90) for gaseous components, which is connected to a unit for analysis or leads to said unit.

In a preferred embodiment, the device has in the high-pressure region of the discharge side of the reaction space, that is between outlet of the reaction space (20, . . . ) and high-pressure separation unit (80), or in a connection of the high-pressure region that leads to the high-pressure separation unit, per unit "reaction space high-pressure separation unit" a connection to a (pressure) holding gas (52), respectively, and, further preferred, a connection to a (pressure) control fluid (60).

In a preferred embodiment, each low-pressure separation unit (80') has a discharge pipe (83') for liquid components and, further preferred, a feed pipe for inert respectively strip gas (94), and, further preferred, a discharge pipe (90) for gaseous components.

In a preferred embodiment, the discharge pipe of the low-pressure separation unit for gaseous components is connected to at least one valve (35) and/or a pipe to a gas-collecting receiver (38).

Thereby, it is particularly preferred that in a parallel arrangement of at least two low-pressure separation units (80') per at least two low-pressure separation units at least two connections to a common gas-collecting receiver (38) are present, respectively.

In a further preferred embodiment, each gas-collecting receiver (38) is in connection with a pressure sensor (36), or a vacuum pump (39), or a discharge pipe (90'), or a combination thereof.

The objects mentioned above are also solved by a method for handling multi-component mixtures, which comprises at least the following steps:

(iii) separating at least one mufti-component mixture, which emanates from at least two parallel reaction spaces (20) into a high-pressure separation unit (80) that corresponds to said reaction spaces, respectively, which is in operative connection with a low-pressure separation unit (80');
(iv) discharging highly volatile gaseous components from at least one high-pressure region of a high-pressure separation unit (80) via a discharge connection (90) for gaseous components, which leads to a system for analysis.

Thereby, it is preferred that the discharge connection (90) comprises at least one restrictor. Thereby, it is further preferred that at least two reaction spaces, high-pressure separation unit and low-pressure separation unit as well as discharge connections are connected in parallel.

In a preferred embodiment, the method comprises at least one further of the following steps:

(i) opening a valve between at least on gas-collecting receiver, which is connected to a low-pressure separation unit, and a vacuum pump and pumping down at least parts of the gas phase, which is present in the gas-collecting receiver, (ii) closing the valve between the gas-collecting receiver and the vacuum pump as soon as a pre-determined sub-pressure is reached;
(v) opening the connection from high-pressure separation unit to low-pressure separation unit as soon as a pre-determined filling level of a high-pressure separation unit is reached, and feeding the fluid being present in the high-pressure separation unit into the low-pressure separation unit;
(vi) feeding inert gas/strip gas into the fluid being present in the low-pressure separation unit;
(vii) transferring the inert gas/strip gas which has been fed into the low-pressure separation unit and/or the gaseous components from the low-pressure separation unit into the gas-collecting receiver;
(viii) discharging the liquid fluid which has been collected within the low-pressure separation unit via a discharge pipe;
(ix) performing the method by means of an automatic process control;
(x) online-analysis of gaseous compounds which are discharged from the high-pressure region via discharge connection (90);
(xi) performing the method via an automatic process control;
(xii) taking-up the liquid fluid which has been discharged from the low-pressure separation unit by means of an automatic sample-collecting system and/or analysis of the product mixture.

The highly volatile gaseous gases, which are removed at the high-pressure separation unit and are fed via the discharge connection (90) to the unit for analysis (55), are also termed as hot gas respectively as permanent gas. Preferably, these highly volatile (or more volatile) gases comprise at least one of the following components: hydrogen, methane, carbon monoxide; $C_2$-components ethane, ethene, ethine; carrier gases; $SO_x$ or $NO_x$. By means of a suitable process guidance, in particular by means of the restrictor elements in the discharge connection (90), the discharge of gaseous components, which have a lower volatility, is largely prevented at this point, so that these components at first remain dissolved in the fluid. This means that the fluid which is collected in the high-pressure separation unit, at first has the function of a matrix, in which gaseous components corresponding to the solubility thereof are partially retained under the respective process conditions.

In a further preferred embodiment of the method, the highly volatile gaseous components, which are removed via the connection (90) from the high-pressure separation unit (80), are directly fed to a unit for analysis (68) in order to qualitatively and quantitatively determine the composition of the more volatile components. For the determination of the hydrogen content as well as further components which are contained in the product gas flow, for example a gas-phase chromatograph can be employed which preferably is provided with a thermal conductivity detector. Thereby, also further detecting methods such as carbon analyser, IR, UV VIS, Raman are conceivable.

By means of removing highly volatile gaseous components already at the high-pressure separation unit (80), the analysis unit, which is connected with the low-pressure separation unit (80') respectively the gas-collecting receiver (38), is released. Furthermore, highly volatile gases (for example $H_2$, $H_2S$, methane, ethane, ethene etc.) preferably require further analysis methods (for example TCD, FID, thermal conductivity detectors) than more volatile gases (ionisation, for example, FID). All in all, by means of the separation of the gas flows to be analysed, a collecting of product fluid flows on the low-pressure side, in particular in gas-collecting receivers, is essentially improved. Furthermore, all in all, the analysis and the achievable mass balance becomes more precise by means of this process guidance.

In the following, the essential technical terms as used in the present invention and, as far as they cannot directly be derived from the technical knowledge, are explained.

A "gas phase reaction" in the meaning of the present invention is a chemical reaction in which all educts and products are present as gases under reaction conditions.

A "liquid phase reaction" In the meaning of the present invention is a chemical reaction, in which all educts and products are liquid under reaction conditions.

A "multi-phase reaction" in the meaning of the present invention is a chemical reaction which proceeds under reaction conditions in the presence of at least two different phases, which are not completely miscible with each other. Thereby, the phases can be all or can be partially or individually liquid and/or solid and/or gaseous. The phases may be educts, or products, or both.

The term "multi-component mixture" in the meaning of the present invention is any mixture of at least two components which may be at least partially separated from each other by means of physical or physico-chemical methods, or combinations thereof. Hereunder, in particular, mixtures of at least two liquid phases, which are not completely miscible with each other, or mixtures of at least one gaseous phase and at least one liquid phase as well as emulsions, dispersions or suspensions are conceived.

A "non-volume-constant reaction" in the meaning of the present invention is any chemical reaction in which the number of moles of gaseous substances is changed per formula conversion, and/or the volume increases respectively decreases by means of a conversion solid/solid, solid/liquid, liquid/liquid, liquid/gaseous or gaseous/gaseous (for non-ideal gases).

The term "high-pressure" in the meaning of the present invention is any pressure which is higher than the pressure prevailing downstream of a constructive component. In general, the pressure on the high-pressure side of the device and thereby, in particular, in the high-pressure separation unit, is in a range of from 5 to 500 bar. Preferably, said pressure is in the range of from 20 to 250 bar, and further preferred is a pressure in the range of from 90 to 150 bar. Relating to the pressure range on the high-pressure side of the device respectively of the reactor and high-pressures separation unit, no fixed upper limits exist, whereby, however, by means of the choice of certain materials as well as constructive features, a certain limit with regard to the upper limit of the pressure may exist, the person in the art knows when considering the materials.

The term "low-pressure" in the meaning of the present invention is a pressure which is lower than the pressure upstream (with regard to the educt flow) of a constructive component. The pressure on the low-pressure side of the device, that is preferably downstream of the high-pressure separation unit, preferably is at least 0.5 bar lower than the pressure on the high-pressure side of the device. Preferably, the pressure on the low-pressure side is in a range of from 0 to 20 bar, further preferred in a range of from 0 to 10 bar. Such a pressure preferably prevails (also) in the low-pressure separation unit.

A "highly volatile gaseous component" is a gas which is already present in the high-pressure separation unit in gaseous state or is transferred to said state.

A "fluid" in the meaning of the present invention is any substance in which the elemental ingredients which build up the substance, for example elements or molecules, however, also agglomerates thereof, move towards each other and, In particular, have no constant long range order towards each other. Thereunder, in particular liquids or gases, however, also waxes, oils, dispersions, fats, suspensions, melts, powdery solids etc. are encompassed. Provided the medium is present in liquid form, also multi-phase liquid systems are fluids.

The term "valve" in the meaning of the present invention is any constructive component which allows to lower the fluid flow including to stop said fluid flow.

A "common educt supply" in the meaning of the present invention is any type of supply in which at least one educt is fed to at least two reaction spaces which are spatially connected with a supply, and in fact in a manner that the reaction spaces are simultaneously and mutually subjected to the at least one educt.

An "educt gas" in the meaning of the present invention is any gas or any gas mixture which can be fad to the reaction spaces, or subsets thereof (via a mutual educt supply). The educt gas may, however, has not to contain an inert gas and/or an admixture, which can serve as an internal standard for the determination of certain properties (for example gas flow etc.).

The educt gas preferably contains at least one component, which takes part in the chemical reaction to be analyzed. The educt gas may also contain liquid components.

A "product" In the meaning of the present invention is any fluid or any fluid mixture as well as any disperse phase (which optionally may contain also solid Ingredients), which may be removed from at least one reaction space and may be analyzed. The product can, however has not to contain educt. The product can, however has not to contain a fluid reaction product of the reaction which has taken place in a reaction space.

In a preferred embodiment, the product is a gas, or a gas mixture, or a liquid which contains a gas being physically or chemically dissolved. If the product is a gas or a gas mixture, then it is termed as a "reaction gas".

A "common educt liquid supply" in the meaning of the present invention is any type of supply in which at least one educt liquid is fed into at least two reaction spaces being spatially connected with each other, and actually in a manner that at least two reaction spaces are simultaneously and mutually subjected to the at least one educt liquid. In this type, the reaction space preferably is a gas-liquid-solid-reactor. The common educt liquid supply preferably is present in addition to the above disclosed common educt supply. Preferably, a supply of a liquid educt is employed in multi-phase reactions.

A "restrictor" in the meaning of the present invention is any constructive component which has a measurable flow resistance when being flown through by a fluid compared to said fluid. "Measurable" thereby means that the flow resistance of each restrictor is at least higher by the factor 2, preferably at least by the factor 5, further preferred higher by the factor 10 than the flow resistance of any other constructive component (component) in the device, except other restrictors.

If restrictors are employed on the inlet side of the reaction space, then in the method according to the invention a pressure drop of at least 2 bar is to be generated, further preferred a pressure drop of at least 5 bar, further preferred of at least 10 bar. Thereby, the pressure drop is the difference "pressure before the reaction space" minus the pressure after the reaction space.

If the restrictors are employed on the outlet side of the reaction space and thus, as the case may be, additionally to the fluid equipartition, serve also for the "expanding" of the pressure prevailing in the reaction spaces on the pressure of the components which, as the case may be, are downstream in the reaction spaces, in the method according to the invention, preferably a pressure drop of at least 10 bar is to be effected, preferably of at least 20 bar.

Pluralities of restrictors preferably are grouped according to their closely related functions as "sets" (or "groups"). Thereby, preferably, a set is a plurality of at least two restrictors, which spatially may belong together (ore also not) which, however, in any case have the same functionality within the device according to the invention. For example, all restrictors belonging to the feed side or outlet side of the reaction spaces or to subsets of the reaction spaces represent such a set. Accordingly, the device according to the invention preferably comprises a set of restrictors which are attributed to the educt liquid supply, or the control fluid supply, or the holding gas supply, or the discharge connections (90) for gaseous components.

For example, restrictors in the meaning of the present invention may be metal plates having bores, sinter metal plates, apertures ("pinholes"), micro-machined channels, capillaries and/or frits (porous materials, in particular sintered ceramic frits), Preferably, said restrictors are to control the flow of the inflowing fluid, and are to ensure an extensive equipartition of the inflowing fluids throughout the individual connections/channels ("passive" restrictors).

A "connection", supply, connection pipe, feed pipe or outlet in the meaning of the present invention is any means which allows a fluidic communication between two points within the device, and which is sealed outwards (outside of the device) with respect to the exchange of materials. Preferably, the connection thereby is fluid-tight, further preferred fluid-tight also at high pressures. Further preferred, the connection is realized by means of the channels, pipes or capillaries as set forth below.

The term "channel" in the meaning of the present invention describes a transversal connection through a body between two openings which are present on the surface of the body preferably a massive body of any geometry, preferably a round component, a cuboid, a disc or a plate which, in particular, allows the passage of a fluid through the body.

A "pipe" in the meaning of the present invention is a channel in which a continuous cavity is formed, and the geometry of the exterior of the pipe essentially follows the geometry of the inner surface which defines the cavity.

A "capillary" essentially may be regarded as a special case of a pipe with the difference that in a capillary—according to the above given requirements with respect to "restrictors"—certain dimensions have to be fulfilled. A capillary in the meaning of the present invention preferably may simultaneously be a "connection" and a "restrictor".

Channel, pipe or capillary may have any geometry. With respect to the cavity formed within the channel, pipe or capillary, a cross-section area may be present which may be changeable or preferably may be constant.

The inner cross-section for example may have an oval, round or polygonal shape having straight or bent connections between the corners of the polygon. Preferred is a round or an equilateral polygonal cross-section.

A "holding gas" in the meaning of the present invention is any gas with which the outlet sides of at least two reaction spaces may be charged via a common holding gas supply so that the pressure in the reaction space is increased with respect to the pressure without holding gas.

As holding gas, any gas or any gas mixture can be employed that does not react with the products flowing from the reaction space as well as with the materials of the device with which it comes into contact, or only reacts in a manner that the reaction to be analyzed is not essentially affected. Preferably, as holding gas, an inert gas or an Inert gas mixture Is employed. Particularly preferred are nitrogen as well as the noble gases of the periodic table of the elements as well as all mixtures thereof.

The function according to the invention of the holding gas is to avoid or to at least minimize volume variations in the individual reaction spaces if at least one non-volume-constant reaction occurs in at least one of the reaction spaces. Without charging with at least one holding gas, volume variations can "strike through" on the part of the device which is on the outlet side of the reaction space.

A "control fluid" in the meaning of the present invention is any gas, or any liquid, or any mixture thereof, by means of which the product flows from at least two reaction spaces can be charged by means of a common control fluid supply.

As control fluid any fluid or any fluid mixture can be employed which does not react with the products flowing from the reaction space as well as with the materials of the device with which it comes into contact, or does only react in a manner that the reaction to be analyzed is not essentially affected.

Thereby, the control fluid may be liquid or gaseous. If the reactions in the reaction space are gas phase reactions, then as control fluid a control gas is preferred. If in the reaction space a liquid phase reaction is carried out, then accordingly a control liquid is preferred.

If the control fluid is a gas, then the above given disclosure with regard to the holding gas applies accordingly. As inert liquids, water and solvents as well as higher-viscous or non-Newtonian liquids such as inert oils are preferred. Supercritical gases are regarded also as liquids for the purposes of the present invention.

Contrary to the holding gas supply which has the function to balance possible volume variations within the individual reaction spaces, it is the function of the control fluid supply to mutually and simultaneously adjust the fluid flows through the individual reaction spaces to a pre-determined same value (control of the flow through the reaction space), and actually without changing the pressure in the reaction spaces.

Preferably, this is achieved thereby that in a mass flow controller the control fluid supply is set to a pre-determined total control fluid flow ($F^R_{gas}$). Thus, since when supplying the control fluid, preferably a restrictor is located between the mass flow controller and the plurality of connections to the individual reaction spaces being spatially separated from each other, and the restrictors all have the same or similar flow resistance(s), the total control fluid is partitioned into same flows to the individual reaction spaces.

If, for example, the flow in the mass flow controller of the control fluid supply is set to a value of 1.5 l/h and, after the mass flow controller, the control fluid supply branches into three separated connections (each having a restrictor), which lead to three reaction spaces being spatially separated from each other, then, after each restrictor, a flow of approximately 0.5 l/h results.

With regard to the flows being set by means of a mass flow controller, preferably by means of a thermal mass flow controller, in principle no restrictions exist. Preferably, the flow of the control fluid is adjusted in a manner that educt may flow from the educt supply through the reaction spaces, or subsets thereof. It is further preferred, that the flow of at least one control fluid has a value of 0.001% to 99.9% of the flow of at least one educt fluid, further preferred 95% to 0.01% thereof, further preferred 90% to 0.1%. If the volume of the reaction spaces is from 0.1 to 50 ml, then in the meaning of the present invention, control fluid flows from 0.5 to 10 l/h are preferred.

Since these flows already, so to speak, are "provided" by means of the control fluid is supply, the flow to be provided by means of the educt supply is lowered, and thus the flow through the reaction spaces, by this amount, respectively. If in the above described "starting period" a constant flow of the control fluid is set, then by means of increasing or lowering said flow of the control fluid, the flow of educt through the reactor can be lowered or increased, respectively, without significantly affecting or affecting at all the pressure in the reaction spaces.

Accordingly, by means of increasing (lowering) the control gas flow from the control gas supply, the educt flow may be lowered (increased) in a gas phase reaction, and by means of increasing (lowering) the control fluid flow from the control fluid supply, the educt flow can be lowered (increased) for a liquid phase reaction.

All in all, in said embodiment, thus it is possible to control in a simple manner and particularly by means of a single mass flow controller the fluid amount flowing through all reaction spaces also during the proceeding of parallel reactions, and indeed without thereby significantly affecting the pressure prevailing in the reaction spaces.

A common "holding gas supply" means that each of the at least two reaction spaces being spatially separated from each other are connected with the same holding gas supply. Moreover, it is also conceivable to employ more than one holding gas supply, with the proviso that the reaction spaces and the holding gas supplies preferably are connected with each other in material connection.

A "flow controller" in the meaning of the present invention Is any constructive component that can measure the fluid flow, for example the total gas flow of a holding gas. Such constructive components are known to the person skilled in the art also as "flow indicator" ("FI"). Flow controllers, which are based on a thermal method, are thereby preferred.

A "pressure controller" in the meaning of the present invention is any constructive component which can measure the pressure of a fluid and, after comparison with a predetermined set point or threshold, as the case may be, may adjust said pressure. Such constructive components are known to the person skilled in the art also as "pressure indicator control" ("PIC").

A "mass flow controller" in the meaning of the present invention is any measure and control loop by means of which the flow of a fluid may be measured and, as the case may be, after comparison with a threshold, may be variably set. A mass flow controller can be regarded as an active restrictor in the meaning as described above. A mass flow controller is also known to the person skilled in the art as "FIC" (flow indicator control). Mass flow controller in the meaning of the present invention may be employed both for liquids and gases. Preferably, such mass flow controllers are employed, which are based on a thermal measure principle.

In preferred embodiments of the present invention, the device according to the invention and the method according to the Invention are used for the removal of multi-component mixtures from high-pressure reactors or from high-pressure systems, in which mixtures of materials are processed, which predominantly are present in liquid phase. In the meaning of the present writ, the term liquid phase mixtures relates to fluids which predominantly are present in liquid phase. Thereby, it is not excluded that in the liquid phase mixture also a certain amount of dispersed solid—such as polymerization catalysts—may be contained. The devices in which the liquid phase mixtures are processed are terminated as devices for liquid phase systems.

In the meaning of the present invention, the term "separator" relates to a vessel in which the liquid and gaseous components, or two liquid components of the product fluid from a reaction space are separated from each other. It is possible—in particular on the low pressure side—that some highly volatile components remain in the liquid phase respectively also that some highly volatile components having a medium volatility trespass into the respective gas phase. By means of stripping (which is realized by means of feeding of inert/strip gas into the liquid phase being present in the separator) volatile components may be nearly completely transferred from the liquid phase into the gas phase. A removal being as complete as possible of components being volatile under these conditions from the liquid phase in the low pressure separation unit is advantageous, since thereby losses by means of uncontrolled degassing may be avoided in the subsequent transfer of the liquid.

An essential performance property of the device according to the invention is for example a high "material recovery rate". Specific number values for the material recovery rate depend on the dimensions of the device.

BRIEF DESCRIPTION OF THE FIGURES

FIG. 1 presents a schematic view of an apparatus having eight reaction spaces (20') arranged in parallel, from which each of them is connected with a unit consisting of a high-pressure separation unit and a low-pressure separation unit (80, 80'). In this embodiment, the gaseous components arising in the high-pressure separation unit (80) are introduced via pipes (not shown here) into the low-pressure separation unit. The gases emanating from the low pressure separation unit are guided via a valve to the analysis unit respectively to discharge pipe.

FIG. 2 presents a magnified schematic view of an individual combination of high-pressure separation unit and low—pressure separation unit which, in FIG. 1, is arranged in parallel to eight units. Thereby, a high pressure separation unit (80) is connected with a low-pressure separation unit (80') via a pipe for liquids (84) and via a pipe for gaseous components (31), whereby a connection (53) to a holding gas (50) is in the pipe between the high-pressure separation unit (80) and the restrictor element (25').

FIG. 3 presents a schematic view of a device for handling fluids according to

FIG. 2, In which the low-pressure separation unit (60') additionally is provided with a mass flow controller (33) and a valve (32) as well as a supply for inert gas, respectively, strip gas.

Figure 1:
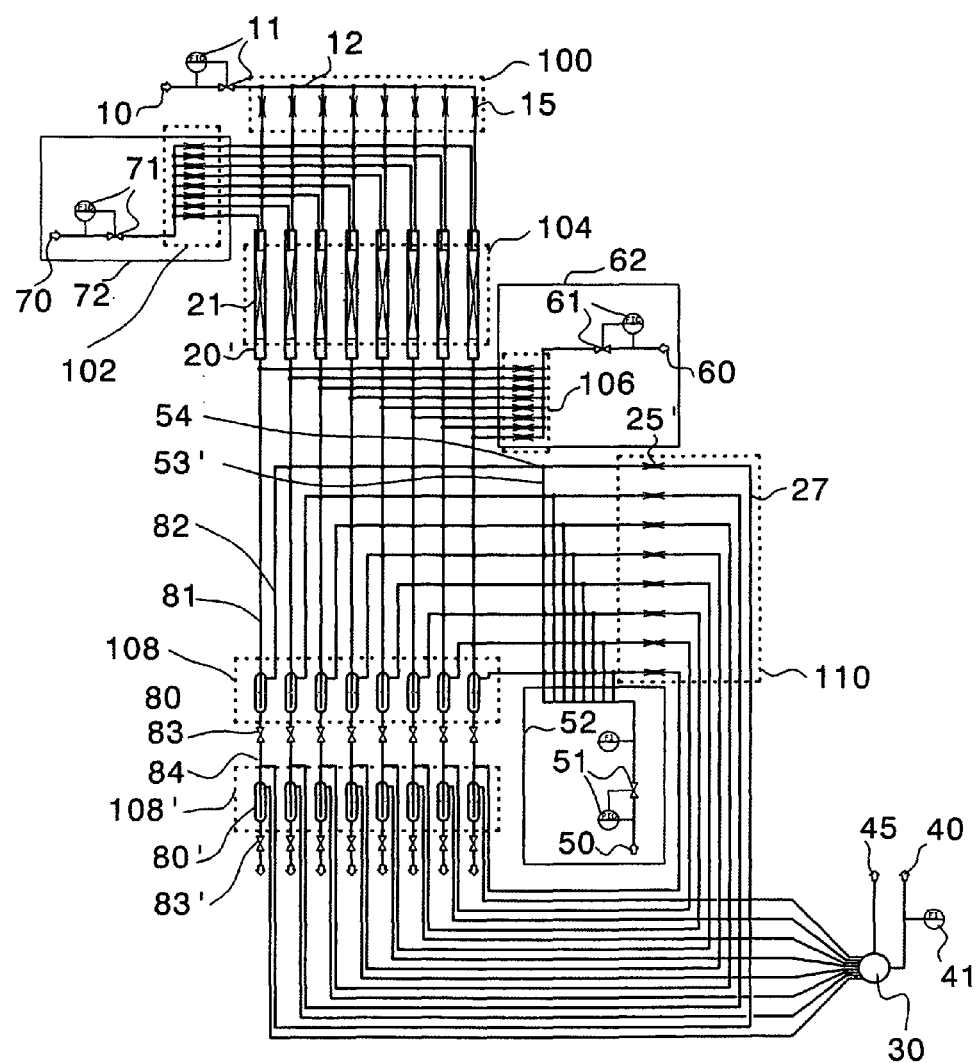
FIGS. 1 to 3 in principle show embodiments which are known from the WO 20051063372, whereas FIGS. 4 to 8 relate to embodiments according to the present invention.

The device according to the invention and the method according to the invention preferably are employed in connection with test devices in the laboratory field or in pilot plants. A use of reactors driven in parallel in the batch operation or in the continuous operation for the manufacture or processing of chemicals in industrial scale, however, is also possible.

The device and the method for handling multi-component mixtures preferably are employed in connection with high-pressure processes.

With the aid of the device according to the invention and the method according to the invention, the handling of multi-component mixtures can be carried out in an improved manner, preferably in parallel. Thereby, the reactions carried out in the reactors, which preferably are carried out in parallel, may be similar or different.

From this results also the preferred application of the invention in the field of the high throughput research and the combinatorial chemistry. Particularly preferred, the Invention may be applied in the analysis of multi-component mixtures, which are generated in experiments with catalysts. Herein, in particular, the device comprising a gas-collecting receiver (38) on the low-pressure side in connection with the discharge pipe (90) for highly volatile gaseous components on the high-pressure side is preferred, since by means of this arrangement also low amounts of product fluid as typically produced in combinatorial tests may be analyzed with high precision and may be balanced with respect to quantities.

In a preferred embodiment, the device and the method for handling multi-component mixtures are employed in connection with apparatuses for the testing of solid catalysts, which are contacted with a fluid flow, in particular with a mixture of fluids.

Preferably, the invention is used for reactions in which the volume is not constant and/or for reactions in which fluid flows through at least two reaction spaces which are spatially separated from each other are to be commonly controlled in a manner being as simple as possible for all reaction spaces or for subsets thereof belonging together. In particular, the preferred embodiments of a holding gas supply (50) and/or a control fluid to supply (60) serve for this.

Another aspect of the invention relates to the construction of the device on the low-pressure side. In a preferred embodiment, the low-pressure separation unit is provided with four connection pipes, in fact a supply pipe, a gas discharge pipe, a discharge pipe for liquid components and a connection to the high-pressure side. Preferably, the discharge pipe for liquid components is provided on the rear side of the low-pressure separation unit. The supply pipe from the high-pressure area to the low-pressure separation unit preferably has a channel/cannula, which leads into the rear portion of the interior of the low-pressure separation unit. Also the pipe for the supply of gaseous components—which preferably is provided with mass flow controller and valve—have a channel/cannula which leads to the rear space of the low-pressure separation unit.

Each individual low-pressure separation unit preferably is connected via a discharge pipe for gaseous components (gas-discharge pipe) and at least one valve with at least one gas-collecting receiver (38). Preferably, a pressure sensor (36) and a vacuum pump (39) are connected to the gas-collecting receiver respectively to the portion of the gas-collecting receiver.

The design of the device for the handling of multi-component mixtures depends on the dimensioning of the apparatus for the testing of solid catalysts as well as the process parameters connected therewith. In general, the apparatus for testing solid catalysts has a catalyst capacity (In the reaction spaces) which is in the range of from 0.5 to 500 ml.

However, it is also possible that a device according to the invention and the method according to the invention are used in connection with technical devices, the dimension of which is larger than the dimension mentioned here.

The ratio of internal volume of the high-pressure separation unit compared to the volume of the employed catalyst preferably is in a range of from 10:1 to 100:1, wherein a ratio in a range of from 20:1 to 50:1 is preferred.

In a preferred embodiment, the internal volume of the low-pressure separation unit at to least corresponds to the internal volume of the high-pressure separation unit. In a preferred embodiment, the retie of internal volume of the low-pressure separation unit to the internal volume of the high-pressure separation unit is in a range of from 1:1 to 3:1, further preferred in a range of from 1:1 to 5:1.

Preferably, in applications for the testing respectively in a laboratory scale, a gas-collecting receiver has an internal volume in the range of from 0.2 to 10 l, wherein an internal volume in the range of from 0.5 to 7.5 l is preferred.

The high-pressure side of the device and the low-pressure side of the device may alternatively be heated or cooled independently from each other. Moreover, also on the low-pressure side, the separation unit as well as the gas-collecting receiver alternatively may be heated or cooled separately from each other.

Preferably, the temperature on the low-pressure side of the device ranges from 5 to 150° C., further preferred from 40 to 140° C., in particular preferred from 50 to 100° C. Furthermore, it is preferred that the low-pressure separation unit and the high-pressure separation unit have the same or a similar temperature (±10%).

For the design of the device for a multi-reactor system, it is inter alia significant that the dimensioning of the individual constructive components of the device are exactly known. Herein, the term "dimensioning of constructive components" relates for example to the length or the diameter of pipes, to the internal volume and to the shape of separation units, to the internal volume and to the shape of the gas-collecting receiver. In a preferred embodiment of the present invention, the constructive components which are used within the device have the same or similar dimension/dimensions. In particular for devices, in which only low amounts of multi-component mixtures are to be handled, inter alia also the adaptation of the individual system components is of significant relevance for the high quality of the performance which can be achieved by means of the device.

In a preferred embodiment of the method, the emptying of the high-pressure separation unit into the low-pressure separation unit occurs in connection with a time-controlled operation of a valve (83) in the connection/pipe between high-pressure separation unit and low-pressure separation unit, wherein the time-controlled operation preferably occurs in an automated manner by means of a process control. The (complete) emptying of the high-pressure separation unit is registered via a flow change or a pressure change within the high-pressure range of the process control. The process control uses the signal in order to automatically close the valve in the connection between high-pressure and low-pressure separation unit.

The temporal intervals between the emptying of the high-pressure separation unit into the low-pressure separation unit and/or the temporal pulsing for the stripping of the liquid on the low-pressure side as well as the point in time of the analysis of the products in general depends on the design and the dimensioning of the device and the used operating conditions respectively process parameters. Since the process control preferably also registers the amount of educt fluid that is introduced into the reaction space, the filling level of the high pressure separation unit may be at least approximately estimated by means of the determination of this value. Possible inaccuracies in the material estimation may occur if, for example, coke is formed on the catalysts.

Depending on the selected reaction parameters, the high-pressure separation unit is filled with the multi-component mixture more or less fast. In a preferred embodiment, at a pre-determined filling level of the high-pressure separation unit, the connecting valve to the low-pressure separation unit is opened and the multi-component mixture is transferred from the high-pressure separation unit into the low-pressure separation unit. Moreover, in a preferred embodiment, the high-pressure separation unit may also be provided with a sensor, by means of which the filling level is registered. Preferably, the transfer of the fluid from the high-pressure separation unit into the low-pressure separation unit is automatedly taken by means of the process control.

In connection with the transfer of the fluid from the high-pressure separation unit to the low-pressure separation unit, an expanding of the fluid takes place in which at least a part of the medium volatile components may be transferred into the gas phase. The gaseous components which are liberated during the expansion are introduced into the gas-collecting receiver. The fluid being received in the low-pressure separation unit typically contains further gaseous components which are dissolved within the fluid and to which are not transferred into the gas phase during the expansion of the fluid.

In order to remove the gaseous components being dissolved in the fluid as completely as possible, thus preferably inert gas/strip gas is flushed through the fluid in the low-pressure separation unit. Hereby, the (lower-volatile) gaseous components that are dissolved in the fluid are to be removed from the fluid for the most part. Preferably, the gaseous components are taken up in a gas-collecting receiver mutually with the inert gas/strip gas.

In a preferred embodiment of the method according to the invention, the strip process is carried out until the pressure in the low-pressure separation unit is above atmospheric pressure. Preferably, the final pressure, that is the pressure after the termination of the strip process, in the low-pressure separation unit is in the range of from 1 to 10 bar, wherein a range of from 1 to 5 bar is further preferred.

Further preferred is a realization of the method in which the low-pressure separation unit and the gas-collecting receiver are tempered in a manner that both have the same or a similar temperature (in the range of from 0 to 20% variation).

According to a further aspect of the present invention, the low-pressure part of the device may be used for the reprocessing of multi-component mixtures, which come from high-pressure liquid-phase systems. As examples, oligomerization respectively polymerization reactions have to be mentioned in which also a certain amount of low-molecular components respectively monomers in liquid-phase systems can occur.

In a preferred embodiment, the method according to the invention is at least partially automatedly carried out by means of a process-control. In a preferred embodiment, sequences of the individual process steps can also be repeated. In test apparatuses which have a multitude of reaction systems, the reaction systems may be actuated sequentially, partially in parallel respectively in parallel by means of the device according to the invention.

According to a preferred embodiment, cleaning steps are integrated in the program procedure. Cleaning steps preferably consist therein that, for example, solvent or flushing gas are rinsed or flushed through parts of the device, or that preferably parts of the device are evacuated in order to remove possible impurities.

The method according to the invention is flexible and thus may be employed also in connection with different reaction processes, which preferably run at high pressures, and in which preferably multi-component containing product fluids occur. As examples among others, the following catalytic processes have to be mentioned; Fischer-Tropsch, hydrotreating, hydro de-sulfurization, and cracking of vacuum-gas-oils.

By means of set points of process conditions (such as pressure, temperature) and/or the adaptation of technical elements (such as resistance value of restrictor elements), the intersection points between the gaseous components and the liquid components can be influenced respectively controlled both on the high-pressure side and the low-pressure side.

It is preferred in the realization of the method according to the invention that within a short time a steady state operating condition is generated between the components which are separated in the high-pressure separation unit and which have been separated into liquid and gaseous components, in particular with respect to the temperature.

The gaseous fluid which is separated in the high-pressure part is preferably continuously removed via the exhaust pipe from the high-pressure part and is directly fed to a separate unit for analysis respectively is led off the system, wherein preferably the volume flow of the exhaust gas that has been led off is registered—preferably by using a flow-controller. The highly volatile compounds emanating from the high-pressure separation unit are typically termed as hot gas (HG), respectively the volume flow which emanates from the high-pressure separation unit is termed as hot gas flow (HGF). Due to the steady state operating conditions within the high-pressure separation unit, the gaseous fluid and the liquid fluid have a largely constant composition which only may change over long periods due to activity losses of the catalyst.

The liquid and the gaseous products which are produced on the low-pressure side are qualitatively and quantitatively analyzed by means of integral analysis (respectively also by means of stepwise integral analysis), respectively. Preferably, for hydrocarbon-containing fluids, the following material balances arise:

$$M_{total\ product} = M_{high\ pressure\ liquid} + HG_{low\ pressure\ side} \quad \text{I)}$$

$$M_{high\ pressure\ liquid} = M_{low\ pressure\ liquid} + M_{low\ pressure\ product\ gas} \quad \text{II)}$$

In a preferred embodiment, the method according to the invention has a high material recovering rate, by means of which a precise mass balancing is possible which is about average. A contribution to the high material recovering rate is provided among others by the discharge pipe for gaseous components (80) which preferably is provided with a restrictor, which is connected to the outlet side of the reaction space of the high-pressure area of the device. By means of the discharge pipe for gaseous compounds, highly volatile components as already discussed are already separated on the high-pressure side and do not affect the unit for analysis on the low-pressure side.

Further preferred embodiments are discussed in the following by means of the Figures:

FIG. 1 presents a parallel arrangement of reaction spaces (20') having high-pressure separation units and low-pressure separation units (80) and (80') as well as connections to a pressure control fluid (60) and a pressure holding gas (50), as is fundamentally known from the WO 2005/083372.

Figure 2:
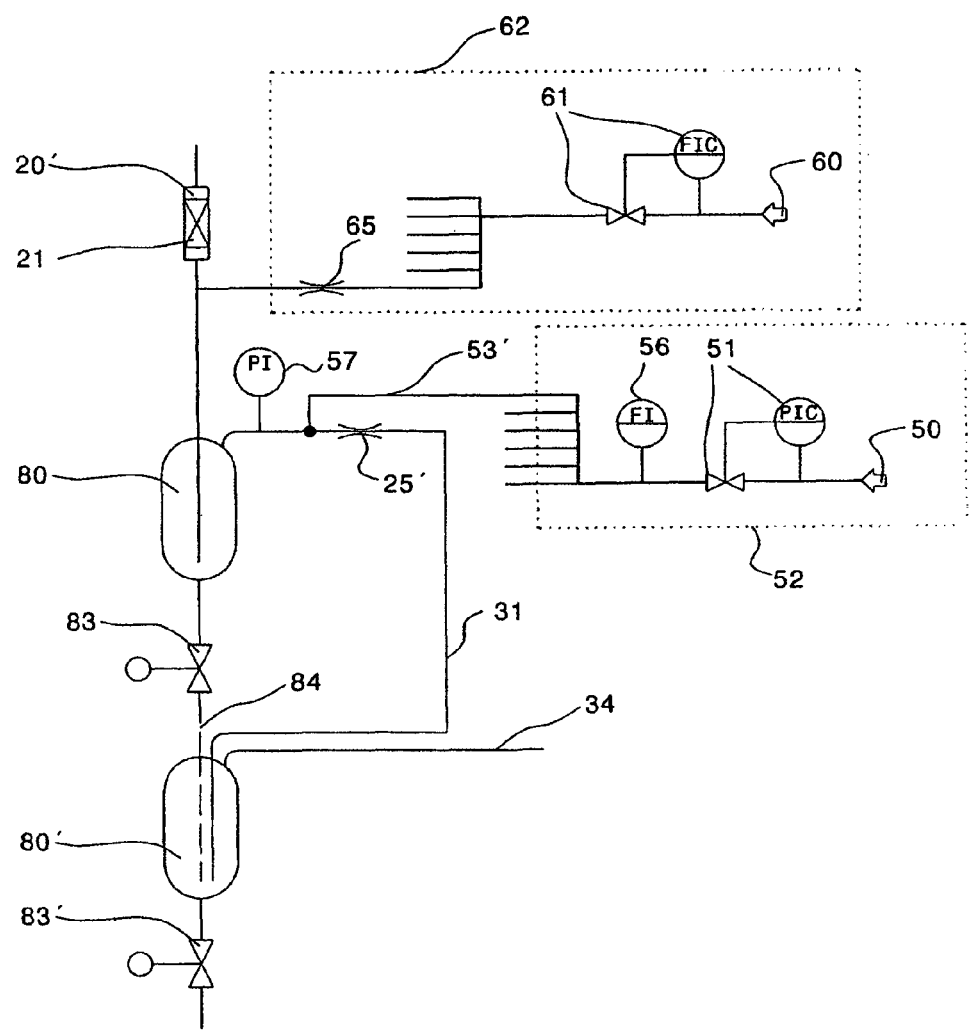
Figure 3:
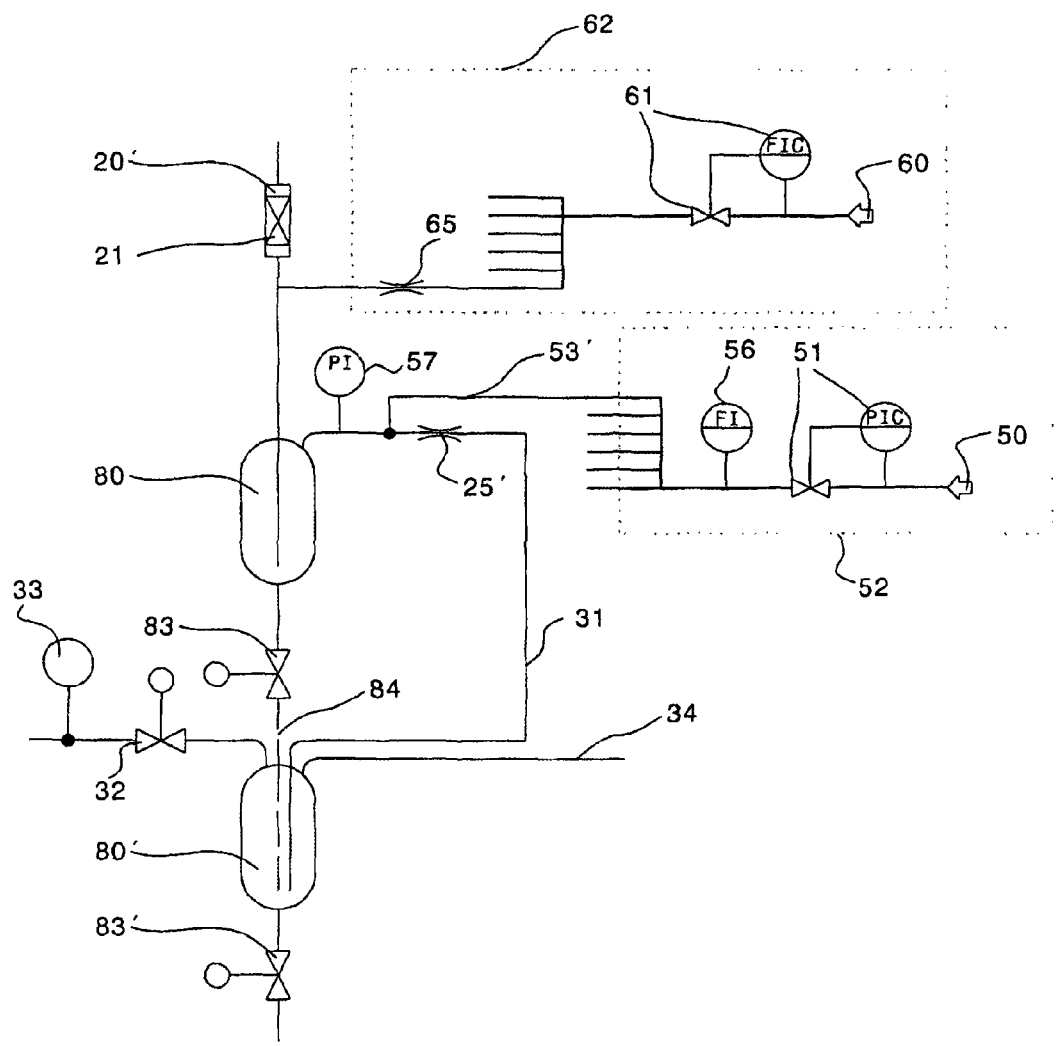

In FIGS. 2 and 3, individual sub-ranges of the device are presented, wherein said sub-ranges present an individual reaction space, which is connected to a unit which consists of a high-pressure separation unit and a low-pressure separation unit. In these embodiments, the high-pressure side is both in connection with a pressure control fluid (62) and a pressure holding gas (52). In general, connection pipes are connected to the units having the pressure control fluid (62) and pressure holding gas (52) to further high-pressure portions of several reaction spaces, since it is advantageous to actuate the downstream high-pressure portions by means of the same units for pressure control fluid (62) and pressure holding gas (52). The respective connection pipes to possible further high-pressure portions are presented within the constructive components (62) and (52) as short horizontal lines. Further details regarding the pressure control fluid and pressure control gas can be taken from the WO 2005/063372.

Figure 4:
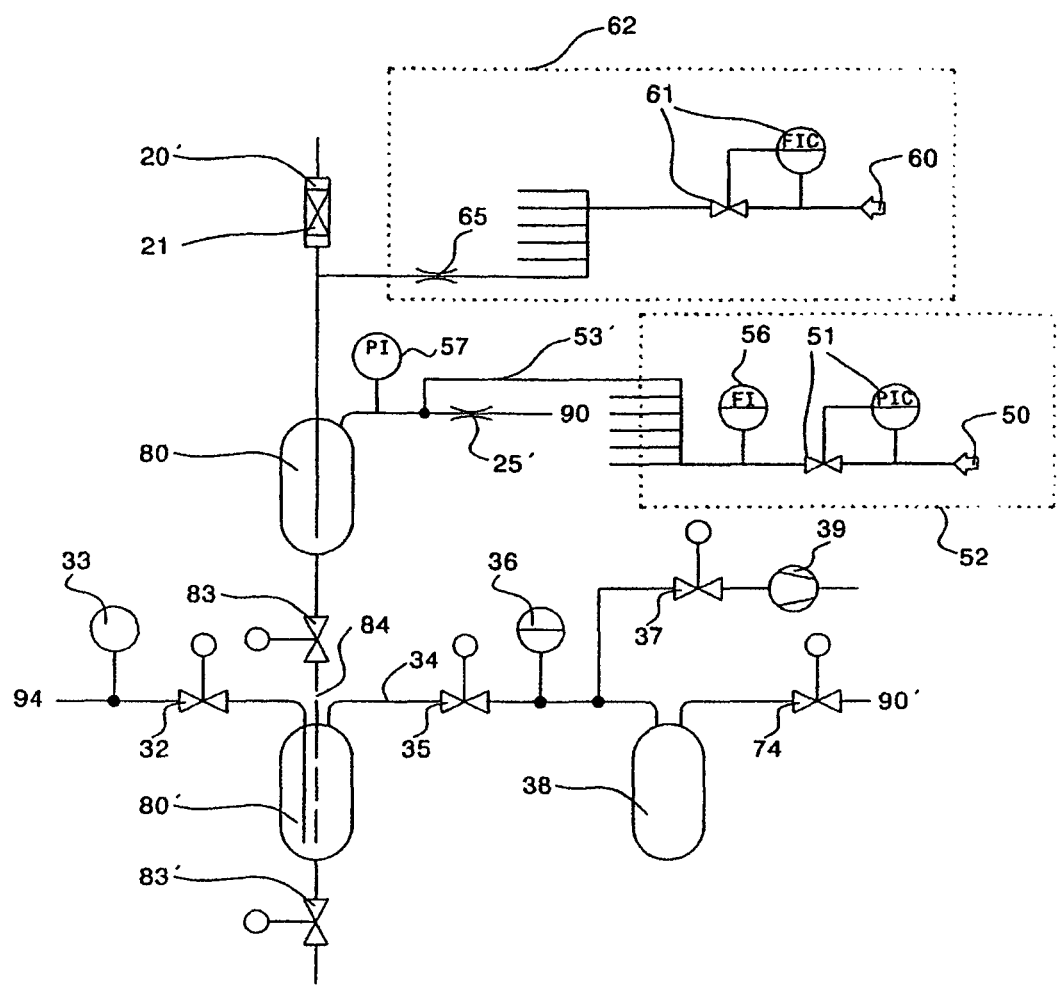
FIG. 4 presents a schematic view of a device for handling fluids in an embodiment according to the invention according to which a discharge pipe (90) for gaseous components is provided at a high-pressure separation unit (80) and leads to a separate unit for analysis. The discharge pipe for gaseous components at the low pressure separation unit is in connection with a gas-collecting receiver (38) via a valve (35).
Figure 6:
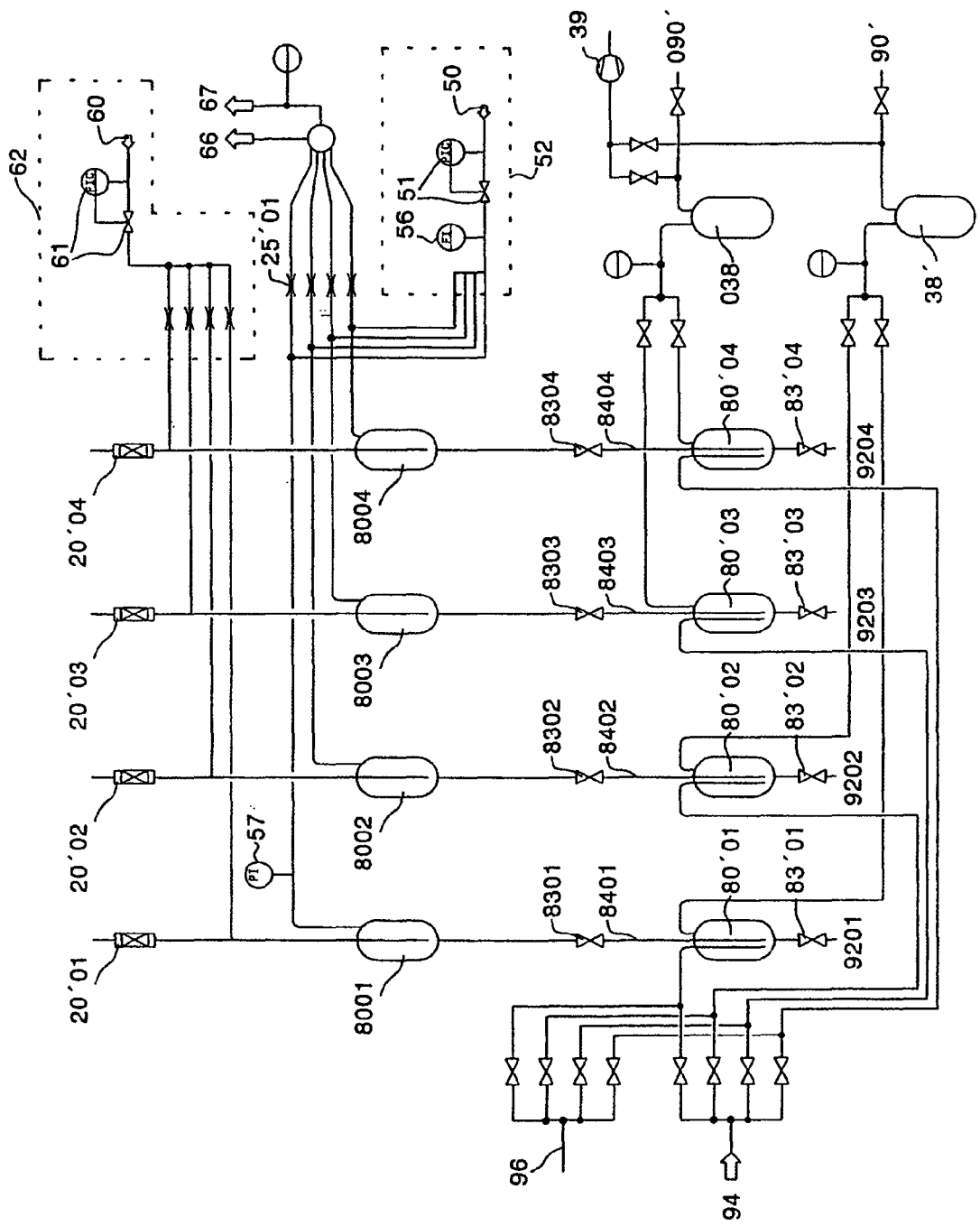
FIG. 6 presents a schematic view of an apparatus, which comprises four reactors which are arranged in parallel. The separation units (80') are connected to a gas-collecting receiver (38, 38'), wherein the presented device has two reactors per gas-collecting receiver, respectively. Each high-pressure separation unit (80) has a discharge (90) for gaseous components.

FIG. 4 is an embodiment of the high pressure separation unit (80) according to the invention, wherein said separation unit has a connection pipe (90) [here with restrictor (25')], which leads to a unit for analysis (66) for highly volatile gaseous components (see FIG. 6). This is contrary to the embodiment which is known from the prior art according to FIG. 3, in which all gaseous components are directed via a connection pipe from the high-pressure separation unit to the low-pressure separation unit.

Preferably, the highly volatile components, which already emanate on the high-pressure side from the discharge pipe as gaseous components, are directly analyzed by means of suitable devices for analysis (66), respectively emanate from the system by the discharge pipe for gaseous components (67), wherein at least the amount of emanating gaseous product can be determined by means of a flow controller.

Figure 5:
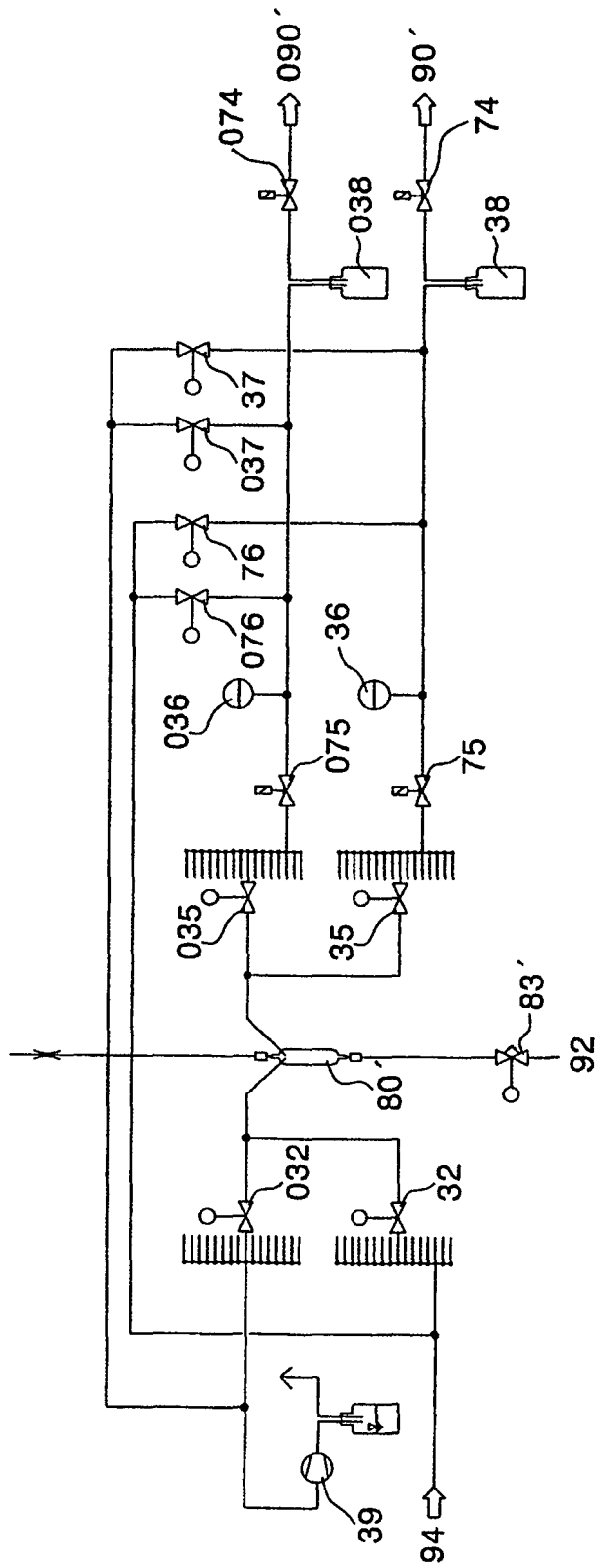
FIG. 5 presents a schematic view of a portion of a device for handling fluids in a preferred embodiment of an apparatus, which is constructed for the high-throughput testing, having 16 reactors being arranged in parallel. Thereby, the low-pressure separation units (80') are connected via valves (35, 75) with the gas-collecting receiver (38).

In FIG. 5, a part of the low-pressure area of the device according to the invention is presented, which is used in connection with an apparatus, in which sixteen reactors are arranged in parallel. The presentation shows a single low-pressure separation unit (80') which is connected by means of the valves (35, 75) and (035, 075) to two different gas-collecting receivers (38, 038). Further separation units are connected with the pipe system between the valves (35) and (75) respectively (035) and (075), wherein the additional connection pipes and the additional separation units are not presented in FIG. 4. In general, it is quite advantageous in the meaning of the device according to the invention, as also can be taken from FIG. 5, that the number of the gas-collecting receivers is different from the number of the low-pressure separation units respectively from the number of the reactors. In a preferred embodiment, the number of gas-collecting receivers is lower than the number of low-pressure separation units.

The device presented in FIG. 5, for example, has sixteen low-pressure separation units and two gas-collecting receivers. Quite generally (that is without restriction to FIG. 5), in a preferred embodiment of the invention, it is possible that each individual gas-collecting receiver (38, 038) can be accessed via distribution pipes and in connection with a suitable valve control separately from each individual separation unit of the multitude (here sixteen) of the low-pressure separation units. In a preferred embodiment of the method according to the invention, the gas of at least one low-pressure separation unit is collected within a gas-collecting receiver, whereas simultaneously the gas of at is least one other low-pressure separation unit does not reach said collecting receiver. It is further preferred that subsequent, in particular subsequent to the analysis of the content of the gas-collecting receiver, the same is rinsed and/or pumped out, and the aforesaid mentioned gas-guidance is inverted. Likewise, it is conceivable that as connecting elements also multi-port valves are employed within the pipe between the low-pressure separation units and the gas-collecting receivers—depending on the number of separation units and gas-collecting receivers, which are integrated in the device. It is possible that the multi-port valves are arranged in connection with, for example, two-way, respectively, three-way valves.

In the apparatus as presented in FIG. 6, which is provided with four reactors (20'01 to 20'04) which are provided in parallel, each individual gas-collecting receiver (38) and (038) is connected to two low-pressure separation units, respectively. This presentation is only exemplary, wherein in a preferred embodiment each individual of the two gas-collecting receivers can be set in operative connection with each of the individual of the four low-pressure separation units by means of connection.

Figure 7:
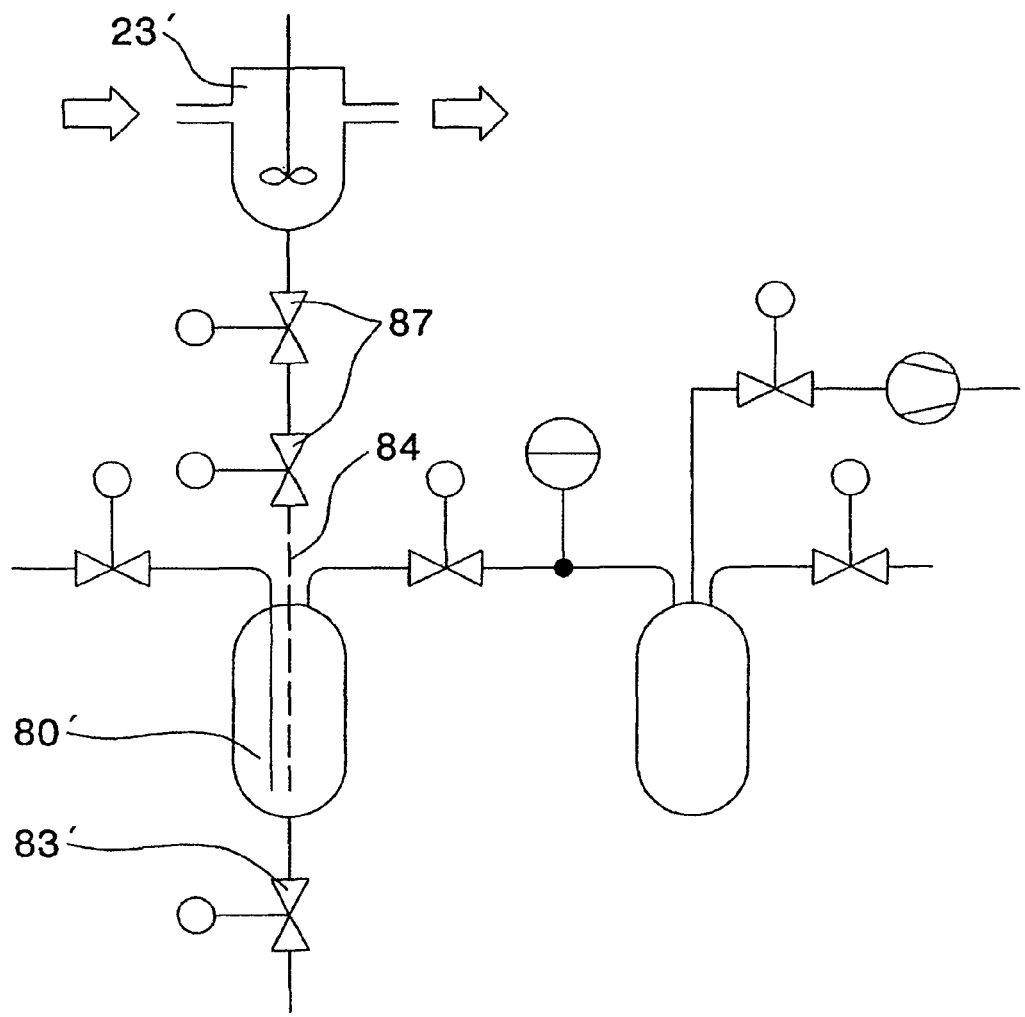
FIG. 7 presents a schematic view of a device in which the device for handling multi-component mixtures is connected via a lock (87) to a continuously driven liquid phase reactor (23').
Figure 8:
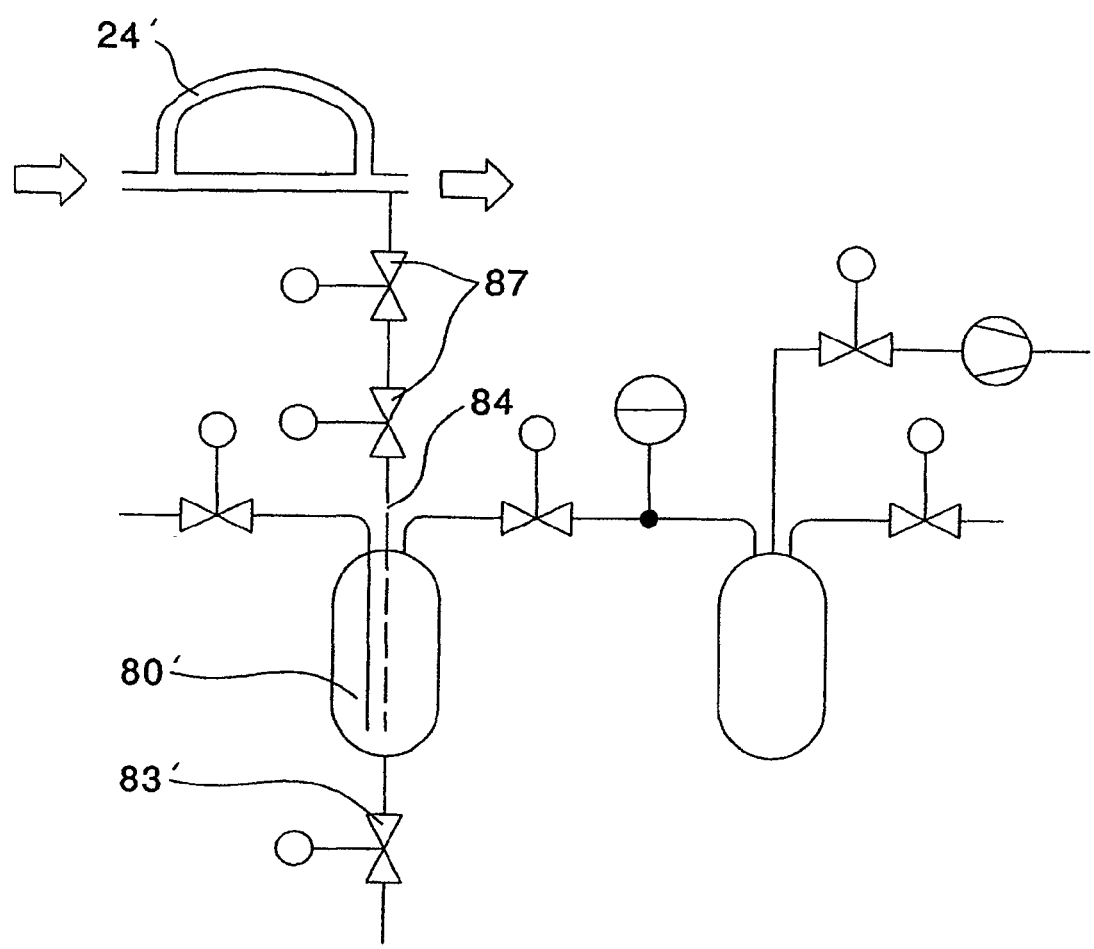
FIG. 8 presents a schematic view of a loop reactor (24) having a connecting element, which is a connecting point to a separation unit (80).

In FIG. 7, the coupling of a part of the device according to the invention for the handling of multi-component mixtures is exemplarily presented for a continuously driven flow reactor, in a preferred embodiment, the connection point between the high-pressure reactor and the device according to the invention consists of a lock (87) as presented in FIG. 7. In another embodiment, the embodiment according to the invention is coupled to a loop reactor (FIG. 8).

REFERENCE NUMERALS

10—supply unit for educt
11—pressure controller for educt
12—common educt supply
15—restrictors at the Inlet side of the reaction space
20'—gas-liquid-solid reactor (reaction space)
21—substance being present in the reaction space (catalyst bed)
25'—restrictors at the discharge side of the reaction gas
27—connection (reaction space—restrictor—multi-port valve)
30—multi-port valve
32—gas-connection pipe (high-pressure side—low-pressure side)
32—valve in pipe (strip gas respectively inert gas) to the low-pressure separation unit
V32—valve in the pipe from the vacuum pump to the low-pressure separation unit
33—mass flow controller
34—discharge pipe for gaseous compounds
35—valve between low-pressure separation unit and gas-collecting receiver
36, 036—pressure sensors
37, 037—valves between gas-collecting receiver and vacuum pump
38, 038—gas-collecting receiver
39—vacuum pump
40—discharge to the unit for analysis
41—flow controller
45—discharge to the delivery device
50—supply pipe for holding gas
51—pressure controller for holding gas
52—common holding gas supply
53—connection (holding gas—reaction spaces)
53'—connection (holding gas supply—reaction gas discharge)
54—knot, mixing point
56—flow sensor
57—pressure sensor
60—supply unit for control fluid
61—mass flow controller for control fluid
62—common control fluid supply
63—connection (control fluid supply—reaction spaces)
65—restrictors for control fluid supply
66—unit for analysis for highly volatile gaseous components (hot gas)
67—discharge for gaseous components
70—supply unit for educt liquid
71—mass flow controller for educt liquid
72—common educt liquid supply
73—restrictors for educt liquid supply
74, 074—valves between gas-collecting receiver and unit for analysis
76, 076—valves between gas-collecting receiver and vacuum pump
80—unit for gas-liquid-separation (high-pressure side)
80'—unit for gas-liquid-separation (low-pressure side)
81—connection (gas-liquid-separation)
82—reaction-gas discharge
83—means for liquid discharge (high-pressure side)
83'—means for liquid discharge (low-pressure side)
84—liquid discharge (low-pressure side)
90—discharge connection from high-pressure separation unit to unit for analysis for hot gas/highly volatile components
90', 090'—connection to unit for analysis for components from the low-pressure separation unit
92—unit for analysis for liquid components respectively sample collector
94—gas supply (inert gas or strip gas)
96—connection pipe to vacuum pump
100-110—zones of separately controlled temperature In connection with the constructive components presented in FIG. 6 relating to a multi-apparatus, additionally the following reference numerals apply:
20131, 20'02, 20'03 . . . —reaction space no. 1, 2, 3 . . . .
25'01, 25'02, 25'03 . . . —restrictor no. 1, 2, 3 . . . on the discharge side of the reaction gas
8001, 8002, 8003 . . . —high-pressure separation unit no. 1, 2, 3 . . . .
8301, 8302, 8303 . . . —means for discharge of liquid no. 1, 2, 3 . . . .
8401, 8402, 8403 . . . —liquid discharge no. 1, 2, 3 . . . .
9201, 9202, 9203 . . . —connection no. 1, 2, 3 . . . to the unit for analysis for liquid components, respectively the sample collector

The invention claimed is:
1. A device for handling and analyzing multi-component mixtures, comprising:
(a) at least two parallel reaction spaces;

(b) at least one high-pressure separation unit for each reaction space;
(c) at least one connection from an outlet side of the reaction spaces to the at least one high-pressure separation unit; and
(d) at least one low-pressure separation unit connected to the at least one high-pressure separation unit via a connection;
wherein each high-pressure separation unit is provided with at least one discharge connection for gaseous components, which is connected to a unit for analysis,
wherein each low-pressure separation unit comprises a discharge pipe for liquid components and a discharge pipe for gaseous components, the discharge pipe of the low-pressure separation unit for gaseous components being connected with at least one gas-collecting receiver, and
wherein the device is configured to direct the gaseous components from the at least one high pressure separation unit to the unit for analysis without passing through the at least one low-pressure separation unit.

2. The device according to claim 1, wherein each low-pressure separation unit has a supply for inert gas and strip gas.

3. The device according to claim 1, wherein in a parallel arrangement of at least two low-pressure separation units per at least two low-pressure separation units at least two connections are provided to a gas-collecting receiver, respectively, which is shared by the at least two low-pressure separation units.

4. The device according to claim 1, wherein each discharge connection comprises at least one restrictor.

5. The device according to claim 3, wherein the ratio of internal volume of the high-pressure separation unit to the volume of an employed catalyst is in a range of from approximately 10:1 to approximately 100:1.

6. A device for handling and analyzing multi-component mixtures, comprising:
(a) at least two parallel reaction spaces;
(b) at least one high-pressure separation unit for each reaction space;
(c) at least one connection from an outlet side of the reaction spaces to the at least one high-pressure separation unit; and
(d) at least one low-pressure separation unit connected to the at least one high-pressure separation unit via a connection;
wherein each high-pressure separation unit is provided with at least one discharge connection for gaseous components, which is directly connected to a unit for analysis such that the device is configured to direct the gaseous components from the at least one high pressure separation unit to the unit for analysis without passing through the at least one low-pressure separation unit, and
wherein each low-pressure separation unit comprises a discharge pipe for liquid components and a discharge pipe for gaseous components.

7. A method for handling multi-component mixtures using the device according to claim 6, the method comprising:
separating at least one multi-component mixture, which emanates from the at least two parallel reaction spaces into the at least one high-pressure separation unit that corresponds to said reaction spaces, respectively, which is in operative connection with the at least one low-pressure separation unit;
discharging highly volatile gaseous components from at least one high-pressure region of the at least one high-pressure separation unit via the at least one discharge connection for gaseous components, which directly leads to the system for analysis.

8. The method according to claim 7, wherein each discharge connection (90) comprises at least one restrictor.

9. The method according to claim 7 further comprising:
(i) opening a valve between at least one qas-collecting receiver, which is connected to the at least one low-pressure separation unit, and a vacuum pump, and pumping down at least parts of the gas phase being present within the gas-collecting receiver;
(ii) closing a valve between the gas-collecting receiver and the vacuum pump as soon as a pre-determined pressure is reached;
(iii) opening the connection from the at least one high-pressure separation unit to the at least one low-pressure separation unit as soon as a pre-determined filling level of the at least one high-pressure separation unit is reached, and feeding the fluid being present in the at least one high-pressure separation unit into the at least one low-pressure separation unit;
(iv) feeding inert gas/strip gas into the fluid being present in the at least one low-pressure separation unit;
(v) transferring the inert gas/strip gas which has been fed into the at least one low-pressure separation unit and/or the gaseous components from the at least one low-pressure separation unit into a gas-collecting receiver;
(vi) discharging the liquid fluid which has been collected within the at least one low-pressure separation unit via a discharge pipe;
(vii) performing the method by means of an automatic process control;
(viii) online-analysis of gaseous compounds which are discharged from the high-pressure region via discharge connection;
(ix) performing the method by means of an automatic process control;
(x) taking-up the liquid fluid which has been discharged from the at least one low-pressure separation unit by means of an automatic sample-collecting system and/or analysis of the product mixture.

10. The method according to claim 7, wherein the highly volatile gaseous compounds, which are discharged at the at least one high-pressure separation unit and are fed via the discharge connection to the unit for analysis, is hot gas.

11. The method according to claim 9 wherein, by means of restrictor elements in the at least one discharge connection, the discharge of gaseous components, which have a lower volatility, from the at least one high-pressure separation unit into the at least one discharge connection, is prevented except for a pre-determined residual value.

12. The method according to claim 9, wherein gaseous components are continuously discharged via the at least one discharge connection for gaseous components.

* * * * *

UNITED STATES PATENT AND TRADEMARK OFFICE
CERTIFICATE OF CORRECTION

PATENT NO. : 8,449,847 B2 Page 1 of 1
APPLICATION NO. : 12/374767
DATED : May 28, 2013
INVENTOR(S) : Haas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 904 days.

Signed and Sealed this
Eighth Day of September, 2015

Michelle K. Lee
*Director of the United States Patent and Trademark Office*